US008629219B2

(12) United States Patent
Wei et al.

(10) Patent No.: US 8,629,219 B2
(45) Date of Patent: Jan. 14, 2014

(54) EPOXY RESIN COMPOUND, PREPARATION METHOD THEREOF, PREPREG MADE THEREFROM, AND COPPER CLADDED LAMINATE MADE THEREFROM

(75) Inventors: Dong Wei, Dongguan (CN); Ke Hong Fang, Dongguan (CN)

(73) Assignee: Guangdong Shengyi Sci. Tech Co., Ltd., Dongguan (CN)

( * ) Notice: Subject to any disclaimer, the term of this patent is extended or adjusted under 35 U.S.C. 154(b) by 328 days.

(21) Appl. No.: 12/820,664

(22) Filed: Jun. 22, 2010

(65) Prior Publication Data

US 2011/0143618 A1 Jun. 16, 2011

(30) Foreign Application Priority Data

Dec. 11, 2009 (CN) .......................... 2009 1 0188905

(51) Int. Cl.
| | |
|---|---|
| *C08K 3/22* | (2006.01) |
| *C08K 3/36* | (2006.01) |
| *C08L 63/00* | (2006.01) |
| *C08L 63/04* | (2006.01) |
| *B32B 15/092* | (2006.01) |
| *B32B 17/04* | (2006.01) |
| *B32B 27/04* | (2006.01) |
| *B32B 27/38* | (2006.01) |

(52) U.S. Cl.
USPC ........ 525/396; 428/297.4; 428/365; 428/418; 523/457; 523/458; 523/466

(58) Field of Classification Search
None
See application file for complete search history.

(56) References Cited

U.S. PATENT DOCUMENTS

| | | | | |
|---|---|---|---|---|
| 5,880,221 | A * | 3/1999 | Liska et al. .................... | 525/397 |
| 6,589,656 | B2 * | 7/2003 | Maekawa et al. ............. | 428/418 |
| 2009/0054587 | A1 * | 2/2009 | Oshimi et al. ................ | 524/612 |
| 2009/0267212 | A1 * | 10/2009 | Wada et al. ................... | 257/687 |
| 2011/0084409 | A1 * | 4/2011 | Sugino et al. ................. | 257/783 |

FOREIGN PATENT DOCUMENTS

| | | | |
|---|---|---|---|
| JP | 2005-239767 A | * | 9/2005 |
| JP | 2006-63114 A | * | 3/2006 |
| WO | WO 2009-150985 A1 | * | 12/2009 |

OTHER PUBLICATIONS

Han et al., "A Kinetic Study of Biphenyl Type Epoxy-Xylok Resin System with Different Kinds of Catalysts," Bulletin of the Korean Chemical Society, vol. 18, No. 11, 1997, pp. 1199-1203.*

* cited by examiner

*Primary Examiner* — Robert Sellers
(74) *Attorney, Agent, or Firm* — Wilmer Cutler Pickering Hale and Dorr LLP

(57) ABSTRACT

The present invention relates to an epoxy resin compound, a preparation method thereof, a prepreg made therefrom, and a copper cladded laminate made therefrom. The epoxy resin compound comprises: 30-80 parts by weight of epoxy resin; 20-50 parts by weight of polyphenylene ether resin of new structure with the number average molecular weight thereof being 1000-5000, which is prepared via the redistribution reaction of polyphenylene ether and phenolic resin with the existing of initiator agent; 0-50 parts by weight of filler; 1-20 parts by weight of ingredient. The epoxy resin compound of the present invention, has good heat resistance and dielectric property, and has a simple preparation process, which is good for batch production. Besides, the laminate material and copper cladded laminate of the present invention, which are made from the above mentioned epoxy resin compound, are used in printed circuit boards to have good heat resistance, dielectric property, and machinability, so as to be good for the signal transmission of a high-frequency PCB.

6 Claims, No Drawings

EPOXY RESIN COMPOUND, PREPARATION METHOD THEREOF, PREPREG MADE THEREFROM, AND COPPER CLADDED LAMINATE MADE THEREFROM

FIELD OF THE INVENTION

The present invention relates to an epoxy resin compound, particularly relates to an epoxy resin compound, a preparation method thereof, a prepreg made therefrom, and a copper cladded laminate made therefrom.

BACKGROUND OF THE INVENTION

Currently, usually a compound system of brominated epoxy resin and dicyandiamide, or a compound system of multifunctional epoxy resin and phenolic aldehyde, is used as the base material for making a PCB. The former has good adhesiveness and machinability, but comparatively bad heat resistance. So, with the lead-free times coming, the heat resistance of a copper cladded laminate is required to be improved. The IPC 4101B standard requires specifically about the four major indicators of a laminate, glass transition temperature (Tg), thermal degradation (TD), time to delamination T XXX, and Z-axis coefficient of thermal expansion (CTE). So, the compound system of multifunctional epoxy resin and phenolic resin is more and more popular in the industry of copper cladded laminate. By using phenolic resin as the hardener, heat resistance and humidity resistance of a copper cladded laminate are greatly improved. However, at the same time, the adhesiveness of the laminate becomes bad, and the machining cost is also obviously increased. So, it is also a good technique to introduce a thermoplastic material with good heat resistance into the matrix resin, and by the technique of interpenetrating polymer networks (IPN), the combination property of the epoxy resin compound is improved. Thermoplastic polyphenylene ether resin has excellent machinability, dielectric property, and a comparatively high glass transition temperature. The polyphenylene ether resin after being heated or after molecular weight redistribution can be compatible with epoxy resin, and with other ingredients, the polyphenylene ether resin can react with epoxy resin by heat cured cross-linked reaction, so as to prepare a copper cladded laminate with excellent heat resistance and dielectric property.

As detailedly reported in the literature [1], dissolve PPO resin into toluene solvent, then respectively add 1%-2% BPA chain-cutting agent, TMDQ, benzoyl peroxide, etc. as the initiator agents, and then react at 90° C. for 2 hours, so as to get low molecular polyphenylene ether resin. After that, add a certain amount of novolac epoxy resin, "Upstage" resin, phenolic resin, zinc stearate, titanate, etc. as the ingredients, stir for 15 minutes, thereby obtaining a glue solution, then impregnate a fiberglass cloth with the glue solution, then bake and cure the impregnated fiberglass by heating and pressing at a certain condition, so as to prepare a copper cladded laminate with good heat resistance. Wherein, the preparation method of "Upstage" resin is that: use 50 parts by weight of 828 epoxy resin, 30 parts by weight of tetrabromobisphenol A, 20 parts by weight of novolac epoxy resin, and 0.2 parts by weight of catalyst to react at 165° C. for 2 hours; wherein, the catalyst to be used can be tetraethylammonium, 2-aminopyrimidine, or triphenylphosphine, etc. The novelty of the literature is the preparation of "Upstage" resin. Although the method can solve the compatibility and heat resistance of PPO and epoxy resin, it still has two disadvantages. First, the DMA map of the final laminate has two peaks, which means the compatibility of PPO and epoxy resin is not good enough. Second, the preparation process is too complicated, which needs two times of reaction, and the reaction temperature is too high, thereby being not good for batch production.

As reported in Chinese patent with the publication number CN1194038, polyphenylene ether resin with the molecular weight being 10000-30000 is heated and dissolved together with phenolic compounds or novolac, then peroxides of certain structure and catalyst are added in for redistribution reaction, thereby obtaining polyphenylene ether resin with the molecular weight being 1000-4000. The emphasis of the patent is the selected peroxides of certain structure, of which the decomposition product is alcohols with a comparatively low boiling point (lower than 150° C.), and the selected peroxides can be:

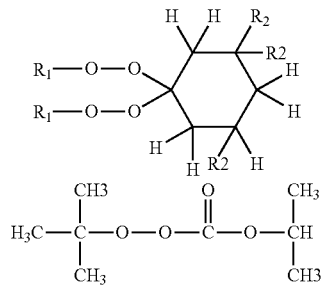

The copper cladded laminate prepared via the above mentioned reaction has excellent combination property. However, since the selected peroxides have comparatively low activity, the chain scission reaction can only occur as adding a certain amount of catalyst or being at a special condition.

Dr. Chunshan Wang respectively used phenolic aldehyde, dicyclopentadiene phenolic aldehyde, DOPO phenolic aldehyde, etc. as the chain-cutting agent to react with polyphenylene ether at a certain condition, thereby preparing a series of polyphenylene ether resins of a different structure. Then the prepared polyphenylene ether resin is curing with epoxy resin, amine type hardener, imidazole catalyst, etc. at a certain temperature, and the basic property of the cured resin is tested. Wherein, the principle of the reaction of dicyclopentadiene and polyphenylene ether is as the following:

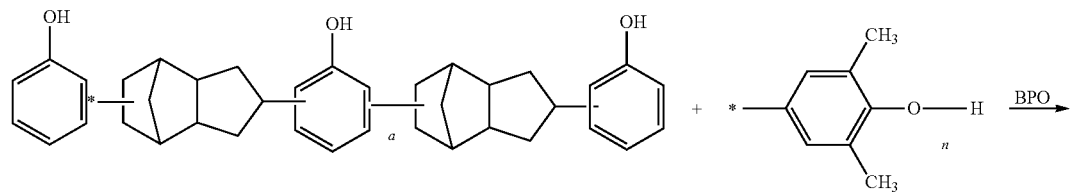

-continued

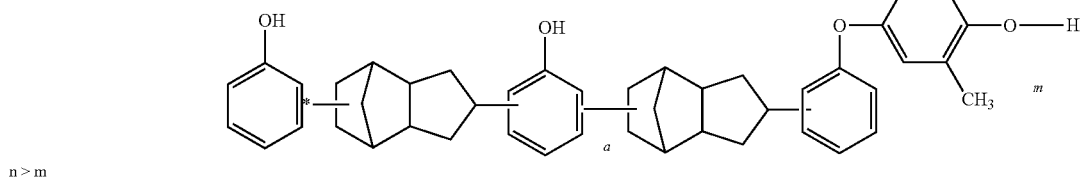

n > m

SUMMARY OF THE INVENTION

An object of the present invention is to provide an epoxy resin compound, and a preparation method thereof, wherein the epoxy resin compound has good heat resistance and dielectric property, and has a simple preparation process, which is good for batch production.

Another object of the present invention is to provide a prepreg and a copper cladded laminate that are made from the above mentioned epoxy resin compound, wherein the prepreg and the copper cladded laminate are used in printed circuit boards, which have good heat resistance, dielectric property, and machinability.

To achieve the above mentioned objects, the present invention provides an epoxy resin compound, which comprises the components and the parts by weight thereof as the following:

30-80 parts by weight of epoxy resin;

20-50 parts by weight of polyphenylene ether resin of new structure with the number average molecular weight thereof being 1000-5000, which is prepared via the redistribution reaction of polyphenylene ether and phenolic resin with the existing of initiator agent; the initiator agent being peroxides or quinone compounds;

0-50 parts by weight of filler;

1-20 parts by weight of ingredient, the ingredient comprising hardener, promoter, and coupling agent.

Wherein, the types of the epoxy resin comprise bisphenol A epoxy resin, bisphenol F epoxy resin, bisphenol S epoxy resin, phenolic epoxy resin, cresol-phenolic epoxy resin, biphenyl epoxy resin, dicyclopentadiene epoxy resin, isocyanate dicyclopentadiene epoxy resin, multi-functional epoxy resin, xylok epoxy resin, and various kinds of brominated epoxy resins, etc. The filler comprises one or multiple kinds of silica, mica, kaolin clay, calcium carbonate, and talcum powder. The redistribution reaction of polyphenylene ether and phenolic resin reacts in toluene or in the mixed solvent of toluene/alcohols. The reaction temperature is controlled to be between 50 and 120.

In the redistribution reaction of polyphenylene ether and phenolic resin, the dosage of phenolic resin is 10%-17% of the parts by weight of polyphenylene ether.

The structure of the phenolic resin can comprise the following types:

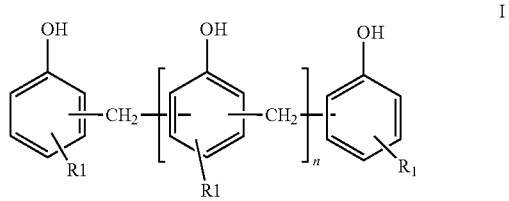

wherein, R1 is H or CH3; n=1-3;

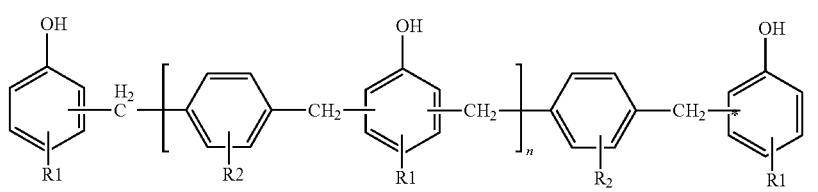

wherein, R1 and R2 represent for H or alkane; n=8-9;

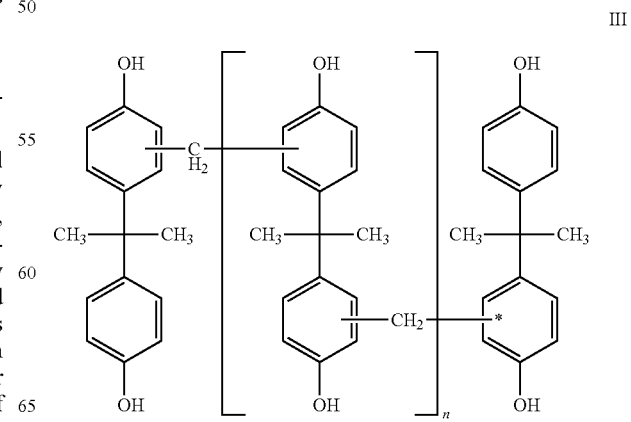

wherein, n=3-4.

The softening point of the phenolic resin is between 40° C. and 120° C.

The initiator agent is benzoyl peroxide, or 3,3',5,5'-tetramethyl-1,4-diphenoquinone.

Furthermore, the present invention also provides a method for preparing the above mentioned epoxy resin compound, and the method comprises: selecting phenolic resin with its softening point being between 40 and 120 to be the chain-cutting agent, obtaining polyphenylene ether resin of structure with the number average molecular weight thereof being 1000-5000 via the redistribution reaction of polyphenylene ether and phenolic resin with the existing of initiator agent, and controlling the temperature of the redistribution reaction to be between 50 and 120; adding in appropriate amount of epoxy resin, then adding in hardener, promoter, and coupling agent for the epoxy resin, and stirring for 30-120 minutes at room temperature or heating condition, thereby obtaining the epoxy resin compound.

The present invention also provides a prepreg made from the above mentioned epoxy resin compound, and the prepreg is prepreg comprising a base material. The base material is fiberglass cloth, non-woven fabrics, or carbon fiber, and the base material is impregnated with the above mentioned epoxy resin compound.

The present invention also provides a copper cladded laminate made from the above mentioned epoxy resin compound. The copper cladded laminate comprises a laminate, and metal foil which is cladded to one side or two sides of the laminate. The laminate comprises a plurality of bonding sheets that are bonded one another, and the bonding sheet is made from the epoxy resin compound.

The advantages of the present invention: the epoxy resin compound of the present invention, has good heat resistance and dielectric property, and has a simple preparation process, which is good for batch production. Besides, the laminate material and copper cladded laminate of the present invention are made from the above mentioned epoxy resin compound and are used in printed circuit boards to have good heat resistance, dielectric property, and machinability, so as to be good for the signal transmission of a high-frequency PCB.

DESCRIPTION OF THE PREFERRED EMBODIMENTS

The present invention provides an epoxy resin compound, which comprises the components and the parts by weight thereof as the following:

30-80 parts by weight of epoxy resin;
20-50 parts by weight of polyphenylene ether resin of structure with the number average molecular weight thereof being 1000-5000, which is prepared via the redistribution reaction of polyphenylene ether and phenolic resin with the existing of initiator agent;
0-50 parts by weight of filler;
1-20 parts by weight of ingredient.

Wherein, the types of the epoxy resin comprise bisphenol A epoxy resin, bisphenol F epoxy resin, bisphenol S epoxy resin, phenol novolak epoxy resin, cresol-phenol novolak epoxy resin, biphenyl epoxy resin, dicyclopentadiene epoxy resin, isocyanate dicyclopentadiene epoxy resin, multi-functional epoxy resin, xylok epoxy resin (4,4-diglycidyloxy-3,3,5,5-tetramethylbiphenyl), and various kinds of brominated epoxy resins, etc.

The redistribution reaction of polyphenylene ether and phenolic resin reacts in toluene or in the mixed solvent of toluene/alcohols. The reaction temperature is controlled to be between 50 and 120, and preferred to be between 80 and 100. In the redistribution reaction of polyphenylene ether and phenolic resin, the softening point of the selected phenolic resin is between and 120, and preferred to be between 40 and 80. The dosage of phenolic resin is 10%-17% of the parts by weight of polyphenylene ether. In the present invention, the initiator agent can be peroxides or quinone compounds, such as benzoyl peroxide, or 3,3',5,5'-tetramethyl-1,4-diphenoquinone. The structure of the phenolic resin can comprise the following types:

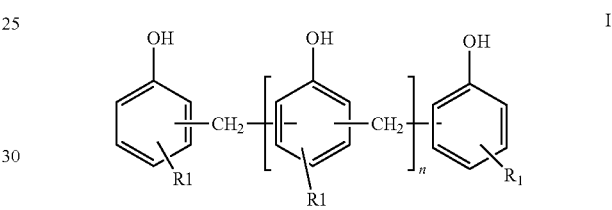

wherein, R1 is H or CH3; n=1-3;

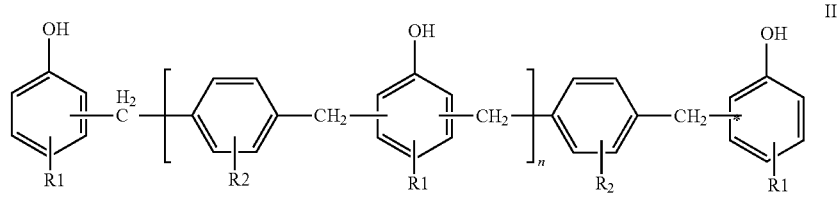

wherein, R1 and R2 represent for H or alkane; n=8-9;

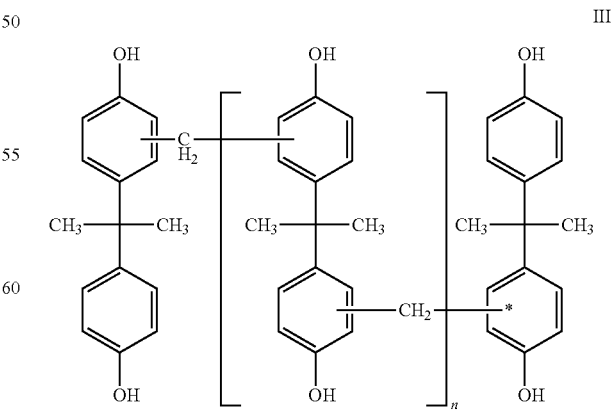

wherein, n=3-4.

The filler of the present invention can comprise one or multiple kinds selected from silica, mica, kaolin clay, calcium carbonate, and talcum powder; wherein, the silica can be one or multiple kinds selected from crystalline type, fused type, and spherical silica type.

The ingredient comprises hardener, promoter, and coupling agent, and in the present invention, the hardener can be selected from amine type hardeners, such as diamino diphenyl methane, m-phenylene diamine, toluene diamine, triethylamine, and 2,2-diamino diphenyl sulfone. To promote the curing reaction of the epoxy resin compound, promoter for curing reaction can be added. The promoter can be imidazole type promoters, such as 2-methylimidazole, 2-ethyl-4-methylimidazole, 2-phenyl-imidazole, or tertiary amine type promoters, such as triethylamine, benzyl dimethylamine, or metal salt promoters, such as organic metal salts of naphthenate, stearic acid, or acetic acid (Co, Mn, Zn, Al). The coupling agent is aminosilane, epoxy silane, mercapto-silane, or methacryloyl silane.

The present invention also provides a method for preparing the above mentioned epoxy resin compound, and the method comprises: selecting phenolic resin with its softening point being between 40 and 120 to be the chain-cutting agent, obtaining polyphenylene ether resin of structure with the number average molecular weight thereof being 1000-5000 via the redistribution reaction of polyphenylene ether and phenolic resin with the existing of initiator agent, and controlling the temperature of the redistribution reaction to be between 50 and 120; adding in appropriate amount of epoxy resin, then adding in hardener, promoter, and coupling agent for the epoxy resin, and stirring for 30-120 minutes at room temperature or heating condition, thereby obtaining the epoxy resin compound.

Furthermore, the present invention also provides a prepreg made from the above mentioned epoxy resin compound, and the prepreg is prepreg. The prepreg comprises a base material, and the base material is impregnated with the above mentioned epoxy resin compound. The base material can be fiberglass cloth, non-woven fabrics, or carbon fiber. When using toluene or ketone as the solvent of the above mentioned epoxy resin compound, at the process of impregnating, it can be appropriately heated up for better impregnating the base material with the epoxy resin compound, and the temperature of the epoxy resin compound is kept between 25° C. and 80° C. After impregnating, the solvent is eliminated by heating, preferred to be baked between 100° C. and 170° C. to eliminate the solvent; preferred resin content in the final base material is between 35% and 70%. The epoxy resin compound can be used in the composite material field of preparing impregnated fiberglass cloth prepreg or other fiber materials.

Besides, the present invention also provides a copper cladded laminate made from the above mentioned epoxy resin compound. The copper cladded laminate comprises a laminate, and metal foil that is cladded to one side or two sides of the laminate. The laminate comprises a plurality of bonding sheets that are bonded one another. The bonding sheet is made from the epoxy resin compound. In an embodiment of the present invention, the copper cladded laminate is made from eight pieces of the above mentioned bonding sheets and two pieces of one ounce copper foils (35 um), which are mutually overlapped and then laminated in a vacuum press, so as to produce a laminate with double copper foil surfaces. Wherein, the hot pressing temperature is 180-200° C., and the pressure is 30-50 Kg/cm$^2$, and the hot pressing time is 90-150 minutes.

According to the following embodiments and comparison examples, the dielectric property, heat resistance, glass transition temperature, etc. of the prepared copper cladded laminate for printed circuit board are tested.

Embodiment 1

Novolac resin with its softening point being 45±2 and its degree of polymerization being 1.5 is used as the chain-cutting agent, so as to prepare polyphenylene ether resin of new structure. 1000 parts by weight of polyphenylene ether resin (SUBIC company, the number average molecular weight being 16000) and 120 parts by weight of novolac resin (Korea KOLON, the mark being KPE-2100) are heated to dissolve, and 35 parts by weight of benzoyl peroxide is added in, the redistribution reaction proceeds as being heated and stirred; the reaction temperature is 95° C., and the reaction time is 2 hours. The number average molecular weight of the reaction product is determined by gel permeation chromatography method (Waters GPC 2000), which is 4540.

Add 150 parts by weight of epoxy resin to 100 parts by weight of the foregoing prepared polyphenylene ether resin, then add ingredients such as hardener, and promoter for the epoxy resin, and stir for 30-120 minutes at room temperature or heating condition, thereby obtaining the above mentioned epoxy resin compound.

Embodiment 2

Novolac resin with its softening point being 45±2 and its degree of polymerization being 1.5 is used as the chain-cutting agent, so as to prepare polyphenylene ether resin of different structure. 1000 parts by weight of polyphenylene ether resin (SUBIC company the number average molecular weight being 16000) and 160 parts by weight of novolac resin (Korea KOLON the mark being KPE-2100) are heated to dissolve, and 25 parts by weight of benzoyl peroxide is added in, the redistribution reaction proceeds as being heated and stirred; the reaction temperature is 95, and the reaction time is 2 hours. The number average molecular weight of the reaction product is determined by gel permeation chromatography method (Waters GPC 2000), which is 4080.

Add 150 parts by weight of epoxy resin to 100 parts by weight of the foregoing prepared polyphenylene ether resin, then add ingredients such as hardener, and promoter for the epoxy resin, and stir for 30-120 minutes at room temperature or heating condition, thereby obtaining the above mentioned epoxy resin compound.

Embodiment 3

Novolac resin with its softening point being 65±2 and its degree of polymerization being 2 is used as the chain-cutting agent, so as to prepare polyphenylene ether resin of different structure. 2400 parts by weight of polyphenylene ether resin (SUBIC company the number average molecular weight being 16000) and 360 parts by weight of novolac resin (Korea KOLON the mark being KPE-2000) are heated to dissolve, and 20 parts by weight of benzoyl peroxide is added in, the redistribution reaction proceeds as being heated and stirred; the reaction temperature is 95, and the reaction time is 2 hours. The number average molecular weight of the reaction product is determined by gel permeation chromatography method (Waters GPC 2000), which is 4842.

Add 150 parts by weight of epoxy resin to 100 parts by weight of the foregoing prepared polyphenylene ether resin, then add ingredients such as hardener, and promoter for the epoxy resin, and stir for 30-120 minutes at room temperature or heating condition, thereby obtaining the above mentioned epoxy resin compound.

Comparison Example 1

BPA type phenolic resin (Kolon, the mark being KBH-L4113) with its softening point being in the range of 120±2 is used as the chain-cutting agent, so as to prepare polyphenylene ether resin of different structure. 100 parts by weight of polyphenylene ether resin (SUBIC company the number average molecular weight being 16000) and 5 parts by weight of phenolic resin (the softening point being in the range of 120±2) are heated to dissolve, and 5 parts by weight of benzoyl peroxide is added in, the redistribution reaction proceeds as being heated and stirred; the reaction temperature is 95, and the reaction time is 2 hours. As a result, much insoluble solid precipitates out from the resin.

The epoxy resin compound is prepared as in the embodiment 1.

Comparison Example 2

Bisphenol A is used as the chain-cutting agent, so as to prepare low molecular polyphenylene ether resin. 100 parts by weight of polyphenylene ether resin (SUBIC company, the number average molecular weight being 16000) and 5 parts by weight of bisphenol A monomer are heated to dissolve, and 5 parts by weight of benzoyl peroxide is added in, the redistribution reaction proceeds as being heated and stirred; the reaction temperature is 95° C., and the reaction time is 2 hours. The number average molecular weight of the reaction product is determined by gel permeation chromatography method (Waters GPC 2000), which is 3440.

The epoxy resin compound is prepared as in the embodiment 1.

Fiberglass cloth is impregnated with the epoxy resin compound prepared in the above mentioned embodiments and comparison examples, and then is baked and pressed, so as to finally obtain the copper cladded laminate, which is tested according to the following standards.

Solder leach resistance 288° C. is determined according to IPC-TM-650 2.4.13.1 by observing the time of delaminating and bubbling; ○ represents for no delaminating and bubbling in 5 minutes, and x represents for delaminating and bubbling in 5 minutes.

The glass transition temperature (Tg DMA method) is determined according to IPC-TM-650 2.4.24.4.

The dielectric property is determined according to IPC-TM-650 2.5.5.9.

According to the experiment condition of "After Thermal Stress" in the method stated in IPC-TM-650 2.4.8, the peel strength (PS) of metal cover layer is measured.

The test result of GPC is shown in the following Table 1.

TABLE 1

| material | Embodiment 1 | Embodiment 2 | Embodiment 3 | Comparison example 1 | Comparison example 2 |
| --- | --- | --- | --- | --- | --- |
| polyphenylene ether | 1000 | 1000 | 2400 | 100 | 100 |
| BPO | 35 | 25 | 20 | 5 | 5 |
| 2100 | 120 | 160 | | | |
| 2000 | | | 360 | | |
| L4113 | | | | 5 | |
| BPA | | | | | 5 |
| Mn | 4540 | 4080 | 4842 | — | 3440 |

— represents for being unable to test.

The combination property of the laminate is shown in the following Table 2.

TABLE 2

| material | Embodiment 1 | Embodiment 2 | Embodiment 3 | Comparison example 2 |
| --- | --- | --- | --- | --- |
| Modified polyphenylene ether | 1000 | 1000 | 1000 | 1000 |
| Epoxy resin | 1980 | 1980 | 1980 | 1980 |
| Curing ingredient | 250 | 250 | 250 | 250 |
| Tg(DSC, ° C.) | 166 | 163 | 168 | 165 |
| Solder leach resistance | ○ | ○ | x | ○ |
| Dk (1 GHZ) | 3.85 | 3.87 | 3.80 | 3.90 |
| Df(1 GHZ) | 0.0090 | 0.0092 | 0.0090 | 0.0095 |

In summary, the epoxy resin compound of the present invention, has good heat resistance and dielectric property, and has a simple preparation process, which is good for batch production. Besides, the laminate material and copper cladded laminate of the present invention, which are made from the above mentioned epoxy resin compound, are used in printed circuit boards to have good heat resistance, dielectric property, and machinability, so as to be good for the signal transmission of a high-frequency PCB.

Although the present invention has been described in detail with above said embodiments, but it is not to limit the scope of the invention. So, all the modifications and changes according to the characteristic and spirit of the present invention, are involved in the protected scope of the invention.

What is claimed is:

1. An epoxy resin compound comprising:
   30-80 parts by weight of epoxy resin;
   20-50 parts by weight of polyphenylene ether resin;
   0-50 parts by weight of filler;
   1-20 parts by weight of ingredient, and the ingredient comprising hardener, promoter, and coupling agent;
   wherein the polyphenylene ether resin has a number average molecular weight of 1000-5000, and is prepared via the redistribution reaction of polyphenylene ether and phenolic resin with the existing of initiator agent the initiator agent is benzoyl peroxide, or 3,3-5,5-tetramethyl-1,4-diphenoquinone;
   wherein the redistribution reaction of polyphenylene ether and phenolic resin reacts in toluene or in the mixed solvent of toluene/alcohols; the reaction temperature is controlled to be between 50° C. and 120° C.;

wherein in the redistribution reaction of polyphenylene ether and phenolic resin, the dosage of phenolic resin is 10%-17% of the parts by weight of polyphenylene ether;

wherein the softening point of the phenolic resin is between 40° C. and 120° C., and the phenolic resin comprises the following structure:

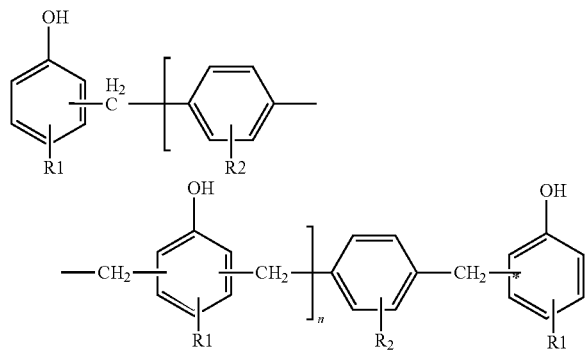

wherein, R1 and R2 represent for H or alkane n=8-9; and

III

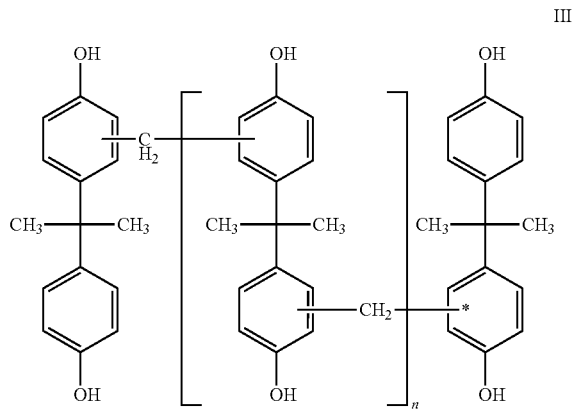

wherein n=3-4; and
wherein the coupling agent is aminosilane, epoxy silane, mercapto-silane, or methacryloyl silane.

2. The epoxy resin compound of claim 1, wherein the epoxy resin comprises bisphenol A epoxy resin, bisphenol F epoxy resin, bisphenol S epoxy resin, phenolic epoxy resin, cresol-phenolic epoxy resin, biphenyl epoxy resin, dicyclopentadiene epoxy resin, isocyanate dicyclopentadiene epoxy resin, multi-functional epoxy resin, or brominated epoxy resins; the filler comprises one or more of silica, mica, kaolin clay, calcium carbonate, and talcum powder.

3. The epoxy resin compound of claim 1, wherein the hardener is an amine hardener, which is diamino diphenyl methane, m-phenylene diamine, toluene diamine, triethylamine, or 2,2-diamino diphenyl sulfone; the promoter is an imidazole promoter, which is 2-methylimidazole, 2-ethyl-4-methylimidazole or 2-phenyl-imidazole; or the promoter is a tertiary amine promoter, which is triethylamine or benzyl dimethylamine; or the promoter is a metal salt promoter, which is organic metal salts of naphthenate, stearic acid, or acetic acid.

4. A preparation method for preparing the epoxy resin compound of claim 1, comprising selecting phenolic resin with its softening point being between 40° C. and 120° C. to be the chain-cutting agent, obtaining polyphenylene ether resin of new structure with the number average molecular weight thereof being 1000-5000 via the redistribution reaction of polyphenylene ether and phenolic resin with the existing of initiator agent, and controlling the temperature of the redistribution reaction to be between 50° C. and 120° C.; adding appropriate amount of epoxy resin, then adding hardener, promoter, and coupling agent for the epoxy resin, and stirring for 30-120 minutes at room temperature or heating condition, thereby obtaining the epoxy resin compound.

5. A prepreg made from the epoxy resin compound of claim 1, comprising the prepreg being prepreg; the prepreg comprising a base material; the base material being fiberglass cloth, non-woven fabrics, or carbon fiber, and the base material being impregnated with the epoxy resin compound.

6. A copper cladded laminate made from the epoxy resin compound of claim 1, comprising a laminate, and metal foil being cladded to one side or two sides of the laminate; the laminate comprising a plurality of bonding sheets bonded one another, and the bonding sheet being made from the epoxy resin compound.

* * * * *